United States Patent
Arai

(10) Patent No.: US 8,964,516 B2
(45) Date of Patent: Feb. 24, 2015

(54) OPTICAL DISC DEVICE AND OPTICAL DISC DETERMINATION METHOD

(71) Applicant: JVC Kenwood Corporation, Yokohama-shi, Kanagawa (JP)

(72) Inventor: Tsutomu Arai, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 14/221,732

(22) Filed: Mar. 21, 2014

(65) Prior Publication Data

US 2014/0293763 A1    Oct. 2, 2014

(30) Foreign Application Priority Data

Mar. 29, 2013   (JP) .................................. 2013-072317

(51) Int. Cl.
*G11B 27/36* (2006.01)
*G11B 19/12* (2006.01)
*G11B 7/24094* (2013.01)

(52) U.S. Cl.
CPC .......... *G11B 19/128* (2013.01); *G11B 7/24094* (2013.01)
USPC ....................................................... 369/53.2

(58) Field of Classification Search
None
See application file for complete search history.

(56) References Cited

U.S. PATENT DOCUMENTS

| | | | |
|---|---|---|---|
| 6,347,067 B1* | 2/2002 | Lee | 369/53.28 |
| 6,816,443 B1* | 11/2004 | Hwang | 369/53.22 |
| 2001/0006211 A1* | 7/2001 | Choi et al. | 369/100 |
| 2004/0196769 A1* | 10/2004 | Nakano et al. | 369/53.28 |
| 2007/0230301 A1* | 10/2007 | Tazaki | 369/53.2 |
| 2008/0002548 A1* | 1/2008 | Jeong | 369/53.22 |
| 2008/0291802 A1* | 11/2008 | Chuang | 369/53.22 |
| 2009/0252010 A1* | 10/2009 | Bakx et al. | 369/53.17 |
| 2010/0271918 A1* | 10/2010 | Feng et al. | 369/53.41 |

FOREIGN PATENT DOCUMENTS

JP       2001-202680 A       7/2001

* cited by examiner

*Primary Examiner* — Thang Tran
(74) *Attorney, Agent, or Firm* — Nath, Goldberg & Meyer; Jerald L. Meyer; Leonid D. Thenor

(57) ABSTRACT

An optical pickup of an optical disc device is configured to read a signal recorded in an optical disc. An envelope signal generation unit is configured to generate an envelope signal from the signal read by the optical pickup. An off-track level storage unit stores an off-track level. An off-track signal generation unit is configured to generate an off-track signal by binarizing the envelope signal, which is generated by the envelope signal generation unit, using the off-track level stored by the off-track level storage unit. A determination unit is configured to output a disc determination signal, which indicates whether the optical disc is a standard-density optical disc or a high-density optical disc in which a line density is higher than the standard density, based on the off-track signal generated by the off-track signal generation unit.

4 Claims, 3 Drawing Sheets

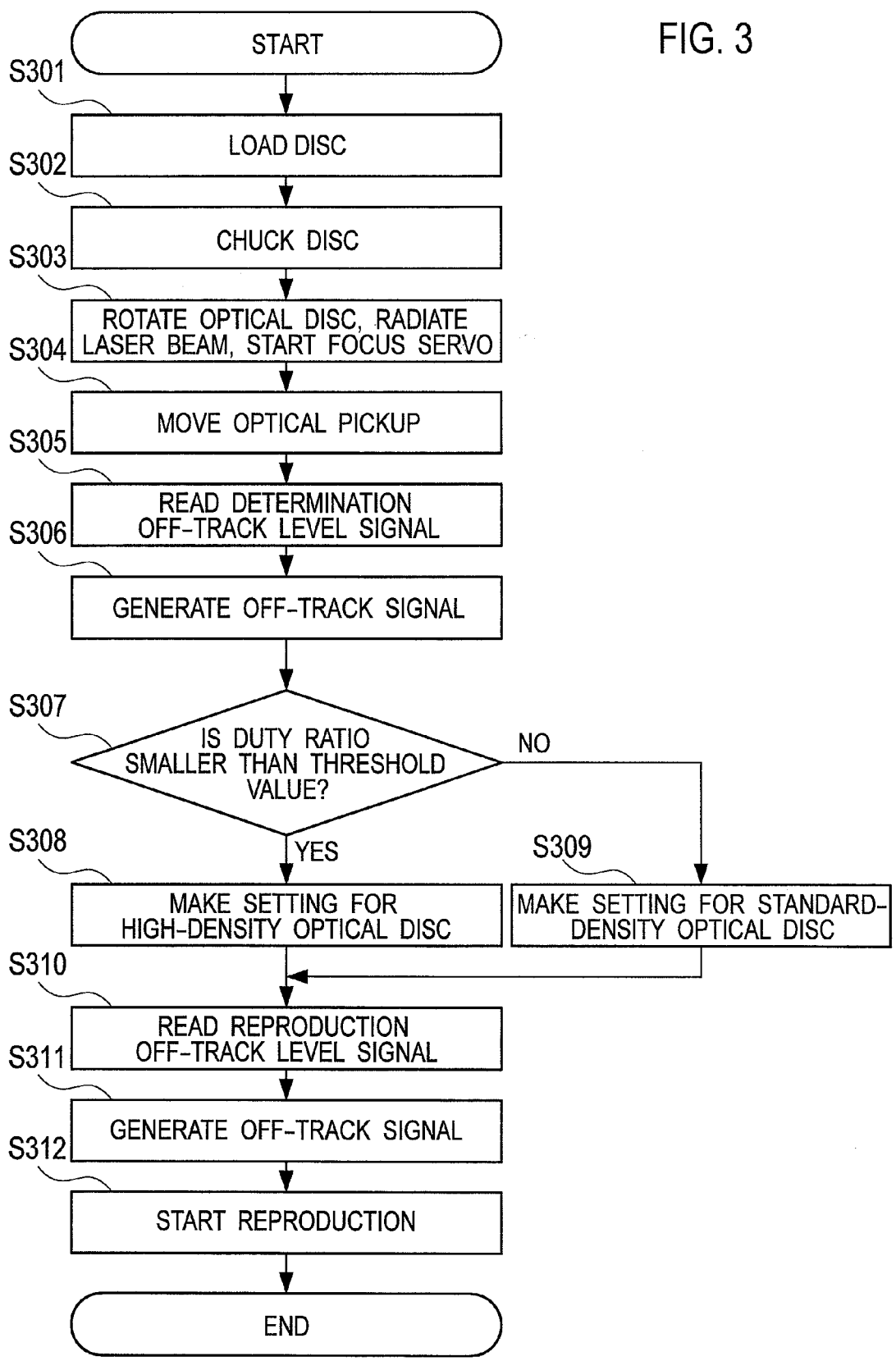

OPTICAL DISC DEVICE AND OPTICAL DISC DETERMINATION METHOD

CROSS REFERENCE TO RELATED APPLICATION

This application is based upon and claims the benefit of priority under 35 U.S.C. §119 from Japanese Patent Application No. 2013-072317, filed on Mar. 29, 2013, the entire contents of which are incorporated herein by reference.

BACKGROUND

The embodiments relate to an optical disc device and an optical disc determination method, which determine whether an optical disc is a standard-density optical disc or a high-density optical disc in which line density is higher than standard density.

There is known a high-density optical disc, in which, in order to increase recording density without changing the recording format of the optical disc to a large extent, line density is increased by narrowing the track pitch, shortening the shortest length of the recording pit, and so on.

For example, the storage capacity of a CD-R as specified in the Orange Book specification is up to 700 MB (80 minutes for music); however, a CD-R with high-density light, which is called a 99-minute medium having a storage capacity exceeding that of the foregoing CD-R, is commercially available. Moreover, a guideline (High Capacity Recordable Disc (HCRD) 1.0) corresponding to such a high-density CD-R is also established.

In order to appropriately play the high-density optical disc as described above, it is desirable to perform signal processing and hardware control, which are intrinsic to the high-density optical disc. Therefore, in an optical disc device, it is desired to determine the high-density optical disc rapidly and simply.

In relation to this, Japanese Patent Laid-Open Publication No. 2001-202680 (Patent Literature 1) proposes an optical disc device which; obtains a determination value, the level of which is changed by an intercode interference value from an envelope signal obtained by playing the optical disc, and; determines the high-density optical disc based on this determination value.

SUMMARY

The optical disc device described in Patent Literature 1 obtains a peak level, abase level when there is interference, and a base level when there is no interference, from a waveform of the envelope signal, then arithmetically calculates the determination value and thereby makes the determination. Therefore, it is necessary for the optical disc device to perform special measurements and arithmetic operations for the determination. In this way, such a conventional optical disc device has a problem that it is not easy to determine a high-density optical disc.

It is an object of the embodiments to provide an optical disc device and an optical disc determination method which can make the determination of a high-density optical disc with ease.

In order to solve the above-mentioned problem inherent in the conventional technology, a first aspect of the embodiment provides an optical disc device comprising: an optical pickup that reads a signal recorded in an optical disc; an envelope signal generation unit that generates an envelope signal from the signal read by the optical pickup; an off-track level storage unit that stores an off-track level; an off-track signal generation unit that generates an off-track signal by binarizing the envelope signal, which is generated by the envelope signal generation unit, using the off-track level stored by the off-track level storage unit; and a determination unit that outputs a disc determination signal, which indicates whether the optical disc is a standard-density optical disc or a high-density optical disc in which a line density is higher than the standard density, based on the off-track signal generated by the off-track signal generation unit.

A second aspect of the embodiment provides an optical disc determination method comprising: a first read step of reading a signal recorded in an optical disc; an envelope signal generation step of generating an envelope signal from the signal read in the first read step; a second read step of reading an off-track level stored in a storage unit; an off-track signal generation step of generating an off-track signal by binarizing the envelope signal, which is generated in the envelope signal generation step, using the off-track level read in the second read step; and a determination step of outputting a disc determination signal, which indicates whether the optical disc is a standard-density optical disc or a high-density optical disc in which a line density is higher than the standard density, based on the off-track signal generated in the off-track signal generation step.

BRIEF DESCRIPTION OF THE DRAWINGS

FIG. 3 is a flowchart showing a procedure of determining a high-density optical disc in the optical disc device according to the embodiments.

DETAILED DESCRIPTION

[Configuration of Optical Disc Device]

A description is made below, in detail, of an optical disc device according to the embodiments by using the drawings. It should be noted that, unless specifically described, constituents, types, combinations, shapes, relative arrangements thereof, and the like, which are described in the present embodiments, are not intended to limit the scope of the invention only thereto and are nothing more than mere explanatory examples. Moreover, the same reference symbols and numerals are assigned to the same portions and items as those already described and a duplicate description is omitted.

Figure 1:
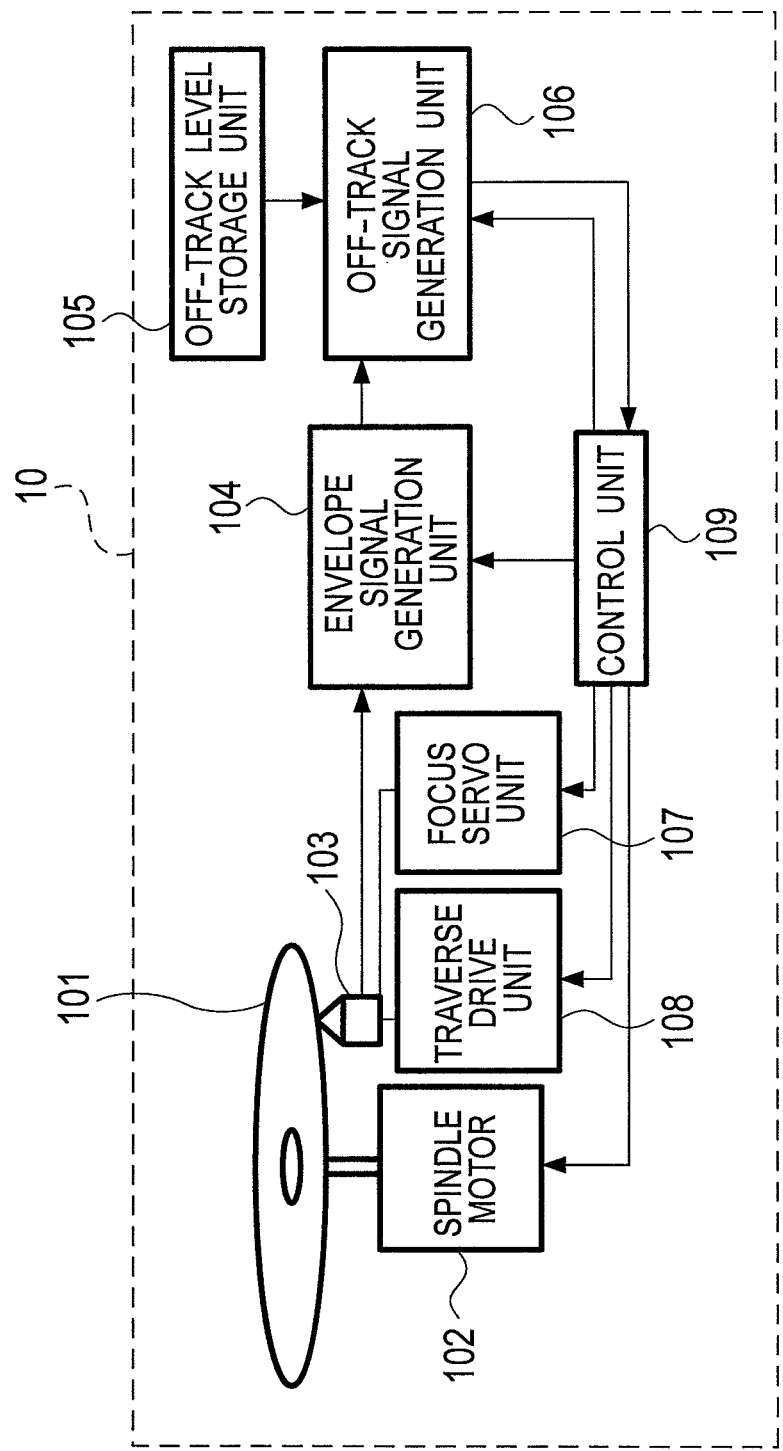
FIG. 1 is a block configuration diagram of an optical disc device according to the embodiments.

FIG. 1 is a block configuration diagram showing a configuration of the optical disc device according to the embodiments.

In FIG. 1, a spindle motor 102 of an optical disc device 10 rotates an optical disc 101. An optical pickup 103 radiates a laser beam onto the optical disc 101, receives reflected light therefrom, and generates an RF signal. An envelope signal generation unit 104 generates an envelope signal based on the RF signal generated by the optical pickup 103.

An off-track level storage unit 105 stores a reproduction off-track level signal and a determination off-track level signal.

An off-track signal generation unit 106 reads either of the reproduction off-track level signal and the determination off-track level signal, which are stored in the off-track level storage unit 105. The off-track signal generation unit 106 generates an off-track signal, which is obtained by binarizing the envelope signal by using the off-track level signal which is read as a threshold value.

The generated off-track signal is used for counting the number of tracks which are crossed in the event of seeking, holding a PLL at an off-track time, and so on.

The off-track signal becomes high when a beam spot on the optical disc 101 from the laser beam is present on a track, and becomes low when the beam spot is out of the track. Therefore, every time the beam spot crosses a track, the off-track signal switches between "High" and "Low".

A focus servo unit 107 performs focus servo for the optical pickup 103. A traverse drive unit 108 moves the optical pickup 103 in the radial direction of the optical disc 101.

Figure 2A:
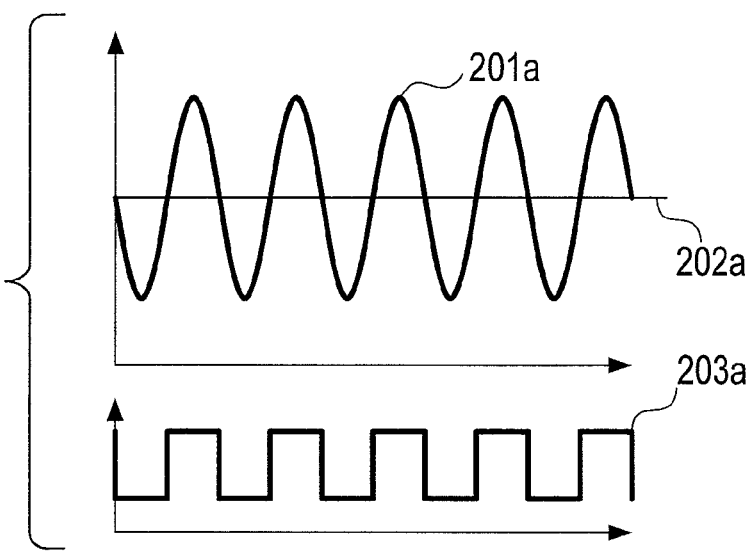
FIGS. 2A to 2C are examples of an envelope signal and an off-track level signal in the optical disc device according to the embodiments.
Figure 2B:
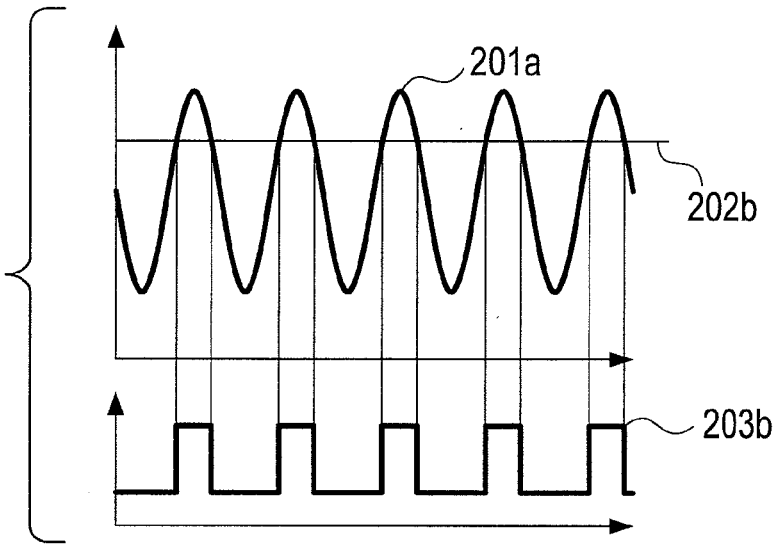
Figure 2C:
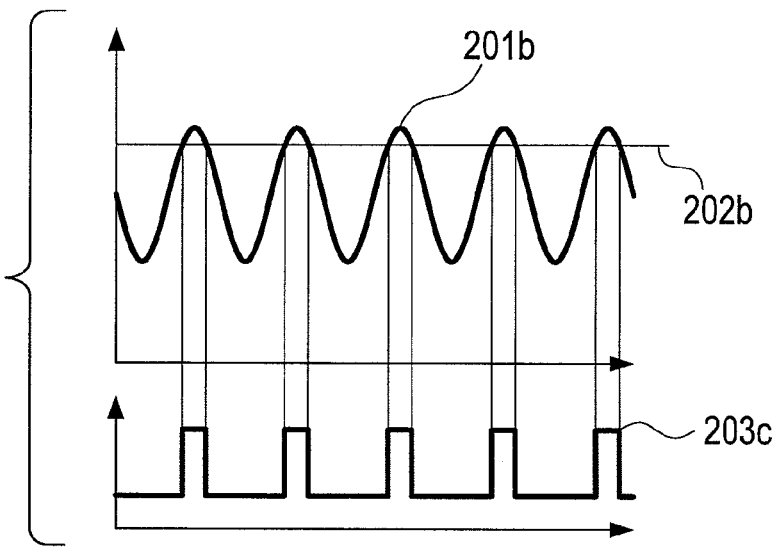

FIGS. 2A to 2C are schematic views showing off-track signals generated from the envelope signal by using a predetermined off-track level signal.

FIG. 2A is an example of an off-track signal 203a at the time of playing a standard-density optical disc, the off-track signal 203a being generated for an envelope signal 201a for the standard-density optical disc by using a reproduction off-track level signal 202a stored by the off-track level storage unit 105.

At the reproduction time, the off-track level storage unit 105 outputs the reproduction off-track level signal 202a.

The RF signal is changed by differences in laser characteristics, reflected light quantity from each optical disc, track pitch and the like, the differences being caused by the type of optical disc played by the optical disc device 10, by influences of the environment at the reproduction time, and by the age of the disc. Hence, the amplitude and DC level of the envelope signal are also changed.

As mentioned above, the off-track signal is a signal used for counting the number of tracks which are crossed in the event of seeking, holding the PLL at the off-track time, and so on, and accordingly, it is necessary for the off-track signal to accurately express the off-track state of the beam spot of the laser beam.

Hence, the reproduction off-track level signal 202a is set so as to have substantially a central value of a typical envelope signal.

In such a way, even if the amplitude and DC level of the envelope signal is changed, the duty ratio of the off-track signal is not changed, and the off-track state of the beam spot of the laser beam can be expressed accurately.

[Determination Method of High-Density Disc]

Next, a description follows of a determination procedure of the optical disc device according to the embodiments based on the flowchart in FIG. 3.

When the optical disc 101 is inserted into the optical disc device 10, a control unit 109 sets the device to determination mode and operates the units of the device accordingly.

First, disc loading is performed, and the optical disc 101 is loaded (Step S301). Subsequently, disc chucking is performed, and the optical disc 101 is chucked (Step S302).

When disc chucking is performed, the spindle motor 102 rotates the optical disc 101, and in addition, the optical pickup 103 radiates the laser beam onto the optical disc 101 that is rotating, and the focus serve unit 107 starts the focus servo (Step S303).

The traverse drive unit 108 moves the optical pickup 103 in the radial direction from the outer circumference of the optical disc 101 toward the inner circumference thereof (Step S304).

The off-track signal generation unit 106 reads the determination off-track level signal from the off-track level storage unit 105 (Step S305).

The off-track signal generation unit 106 generates the off-track signal, which is obtained by binarizing the envelope signal by using the determination off-track level signal as a threshold value (Step S306).

The determination off-track level signal stored by the off-track level storage unit 105 is an off-track level signal for determining a high-density optical disc and has a different value from that of the reproduction off-track level signal 202a shown in FIG. 2A.

A description follows of the determination off-track level signal by using FIG. 2B and FIG. 2C.

FIG. 2B is an example of an off-track signal 203b at the time of determining a standard-density optical disc, the off-track signal 203b being generated for the envelope signal 201a for the standard-density optical disc by using a determination off-track level signal 202b stored by the off-track level storage unit 105.

As mentioned above, the reproduction off-track level signal 202a has a value approximate to the central value of the envelope signal, and the off-track signal which is generated thereby accurately expresses the off-track state of the beam spot.

In contrast to this, the determination off-track level signal 202b has a value which is offset from the central value of the envelope signal, and in this embodiment, is set at a value higher than the central value of the envelope signal as shown in FIG. 2B.

In general, a high-density optical disc has a narrow track width, and accordingly, the amplitude of the envelope signal is small. Hence, if the envelope signal is binarized using the off-track level signal which is offset from the central value, then the resulting duty ratio is largely dependent on the amplitude and will substantially change when the amplitude is changed.

FIG. 2C is an example of an off-track signal 203c at the time of determining a high-density optical disc, the off-track signal 203c being generated for the envelope signal 201b of the high-density optical disc by using the determination off-track level signal 202b.

As is obvious from FIGS. 2B and 2C, in the off-track signal 203c at the time of determining a high-density optical disc, which is shown in FIG. 2C, a ratio "Hi" is smaller than in the off-track signal 203b at the time of determining a standard-density optical disc, which is shown in FIG. 2B. That is to say, the duty ratio is smaller.

In this way, in the high-density optical disc, the amplitude of the envelope signal is small, and accordingly, the duty ratio of the off-track signal becomes small. The determination off-track level signal 202b is set at a value different from that of the reproduction off-track level signal 202a, whereby it is made easy to determine the high-density optical disc.

The off-track signal generated by the off-track signal generation unit 106 is sent to the control unit 109. Based on the off-track signal sent thereto, the control unit 109 determines whether the inserted disc is a high-density optical disc.

Specifically, the control unit 109 confirms whether or not the duty ratio of the off-track signal is smaller than a predetermined threshold value (Step S307) and determines that the optical disc concerned is a high-density optical disc in the case where the duty ratio is smaller than the threshold value.

Note that, if the determination off-track level signal is set at a value lower than the central value of the envelope signal, it just needs to be determined whether or not the duty ratio is larger than the threshold value.

When a high-density optical disc has been determined, the control unit 109 shifts from determination mode to reproduction mode, sends a determination signal indicating a high-density optical disc, and sets the device units to the high-density optical disc setting (Step S308).

The settings for a high-density optical disc are signal processing and hardware control which are intrinsic to high-density optical discs. The setting concerned is a known technology, and accordingly, a description thereof is omitted here.

In the case where the duty ratio is not smaller than the predetermined value in Step S307, it is determined that the optical disc concerned is a standard density-optical disc, and the units are set to the standard-density optical disc setting (Step S309). Alternatively, such a configuration may be adopted in which initial setting of the units is the standard-density optical disc setting, and the control unit 109 performs no unit setting when it is determined that the optical disc concerned is a standard-density optical disc.

In reproduction mode, the off-track signal generation unit 106 reads the reproduction off-track level signal 202a from the off-track level storage unit 105 (Step S310).

The off-track signal generation unit 106 generates the off-track signal, which is obtained by binarizing the envelope signal by using the reproduction off-track level signal 202a as a threshold value (Step S311).

After instructing the units to perform the processing as described above, the control unit 109 starts reproduction (Step S312).

As mentioned above, the reproduction off-track level signal 202a has substantially the central value of the typical envelope signal, and accordingly, even if the amplitude and DC level of the envelop signal is changed, the off-track state of the beam spot of the laser beam can be expressed accurately.

The off-track signal generation unit 106 sends the generated off-track signal to the control unit 109, and accordingly, the control unit 109 performs a variety of controls based on the off-track signal concerned.

As described above, the optical pickup 103 and the envelope signal generation unit 104 are capable of functioning as an envelope signal generation unit, which reads out the signal recorded in the optical disc 101 and generates the envelope signal.

The control unit 109 is capable of functioning as a determination unit which generates a disc determination signal based on the off-track signal generated by the off-track signal generation unit 106, the disc determination signal indicating whether the optical disc is a standard-density optical disc or a high-density optical disc in which the line density is higher than the standard density.

In the optical disc device 10 of this embodiment, the off-track level signal is switched at determination time, whereby the off-track signal for use at reproduction time can also be used for determining a high-density optical disc.

In such a way, it is not necessary to provide a special circuit to perform special processing, nor to perform a special arithmetic operation for the purpose of the determination. Hence, the determination of the high-density optical disc can be made with ease.

What is claimed is:

1. An optical disc device comprising:
an optical pickup configured to read a signal recorded in an optical disc;
an envelope signal generation unit configured to generate an envelope signal from the signal read by the optical pickup;
an off-track level storage unit that stores an off-track level;
an off-track signal generation unit configured to generate an off-track signal by binarizing the envelope signal using the off-track level stored by the off-track level storage unit, the envelope signal being generated by the envelope signal generation unit; and
a determination unit configured to output a disc determination signal based on the off-track signal generated by the off-track signal generation unit, the disc determination signal indicating whether the optical disc is a standard-density optical disc or a high-density optical disc in which a line density is higher than the standard density,
wherein the off-track level storage unit stores a determination off-track level and a reproduction off-track level, the reproduction off-track level being different from the determination off-track level, and
wherein the off-track signal generation unit is configured to generate the off-track signal by reading the determination off-track level when determining whether the optical disc is the standard-density optical disc or the high-density optical disc, and to generate the off-track signal by reading the reproduction off-track level at a time when the optical disc is played.

2. The optical disc device according to claim 1,
wherein a difference between the determination off-track level and a central value of the envelope signal is larger than a difference between the reproduction off-track level and the central value of the envelope signal, and
the determination unit is configured to output the disc determination signal in response to a duty ratio of the off-track signal.

3. An optical disc determination method comprising:
a first read step of reading a signal recorded in an optical disc;
an envelope signal generation step of generating an envelope signal from the signal read in the first read step;
a second read step of reading an off-track level stored in a storage unit;
an off-track signal generation step of generating an off-track signal by binarizing the envelope signal using the off-track level read in the second read step, the envelope signal being generated in the envelope signal generation step; and
a determination step of outputting a disc determination signal based on the off-track signal generated in the off-track signal generation step, the disc determination signal indicating whether the optical disc is a standard-density optical disc or a high-density optical disc in which a line density is higher than the standard density,
wherein the storage unit stores a determination off-track level and reproduction off-track level, the reproduction off-track level being different from the determination off-track level, and
wherein the off-track signal generation step generates the off-track signal by reading the determination off-track level when determining whether the optical disc is the standard-density optical disc or the high-density optical disc, and generates the off-track signal by reading the reproduction off-track level at the time when the optical disc is played.

4. The optical disc determination method according to claim 3, wherein:
a difference between the determination off-track level and a central value of the envelope signal is larger than a difference between the reproductive off-track level and the central value of the envelope signal, and
the determination step includes outputting the disc determination signal in response to a duty ratio of the off-track signal.

* * * * *